U.S. Patent Number: 5,838,991
Date of Patent: Nov. 17, 1998

Shipman

[54] PREEMPTABLE IDLE TIME ACTIVITIES FOR CONSTANT DATA DELIVERY BY DETERMINING WHETHER INITIATING A HOST COMMAND WILL CONFLICT WITH AN IDLE TIME ACTIVITY BEING EXECUTED

[75] Inventor: James R. Shipman, San Jose, Calif.

[73] Assignee: International Business Machines Corporation, Armonk, N.Y.

[21] Appl. No.: 366,035

[22] Filed: Dec. 29, 1994

[51] Int. Cl.⁶ .................................................. G06F 13/00
[52] U.S. Cl. ......................... 395/838; 395/825; 395/834; 395/837; 395/879
[58] Field of Search ...................... 324/537; 395/182.04, 395/183.01, 550, 843, 844, 860, 886, 375, 650, 840, 305, 825, 834, 837, 879, 838; 370/85.5

[56] References Cited

U.S. PATENT DOCUMENTS

| | | | |
|---|---|---|---|
| 4,181,934 | 1/1980 | Marenin | 395/860 |
| 4,181,938 | 1/1980 | Suzuki et al. | 395/843 |
| 4,451,884 | 5/1984 | Heath et al. | 395/844 |
| 4,458,313 | 7/1984 | Suzuki et al. | 395/843 |
| 4,470,109 | 9/1984 | McNally | 395/550 |
| 4,479,179 | 10/1984 | Dinwiddie, Jr. | |
| 4,509,113 | 4/1985 | Heath | 395/886 |
| 4,517,641 | 5/1985 | Pinheiro | 395/840 |
| 4,819,229 | 4/1989 | Pritty et al. | 370/85.5 |
| 4,930,068 | 5/1990 | Katayose | |
| 4,959,774 | 9/1990 | Davis | 395/182.04 |
| 4,979,099 | 12/1990 | Milia et al. | 395/305 |
| 5,070,448 | 12/1991 | Crandall | 395/183.01 |
| 5,073,855 | 12/1991 | Staplin et al. | 395/375 |
| 5,144,230 | 9/1992 | Katoozi et al. | 324/537 |
| 5,301,321 | 4/1994 | Bell et al. | 395/650 |
| 5,313,626 | 5/1994 | Jones. | |
| 5,329,626 | 7/1994 | Klein et al. | 395/375 |

FOREIGN PATENT DOCUMENTS

| | | |
|---|---|---|
| 58-040670 | 3/1983 | Japan. |
| 1-149155 | 6/1989 | Japan. |

*Primary Examiner*—Thomas C. Lee
*Assistant Examiner*—Po C. Huang
*Attorney, Agent, or Firm*—Merchant, Gould, Smith, Edell, Welter & Schmidt, P.A.

[57] ABSTRACT

A method and apparatus for performing preemptable calibration and housekeeping functions during idle time between commands thereby maximizing data throughput. The idle time activities are scheduled on an infrequent time scale. A single seek is used to get to a measurement location. Once the read/write head is positioned at the measurement location, it stays there for a fairly long time in order to make many measurements. If a new host command arrives, the test is aborted and the host command is serviced. The new command is begun without performing any clean-up activity and may or may not record the point at which the idle time activity was abandoned and idle time activity is reinitiated after the new command is completed. Results from the idle time activity is committed to the disk or RAM only after completion of an idle time activity, and thereafter another idle time activity is begun. Thus, constant data delivery is provided by the preempting of the idle time activity which thereby maximizes data throughput.

39 Claims, 3 Drawing Sheets

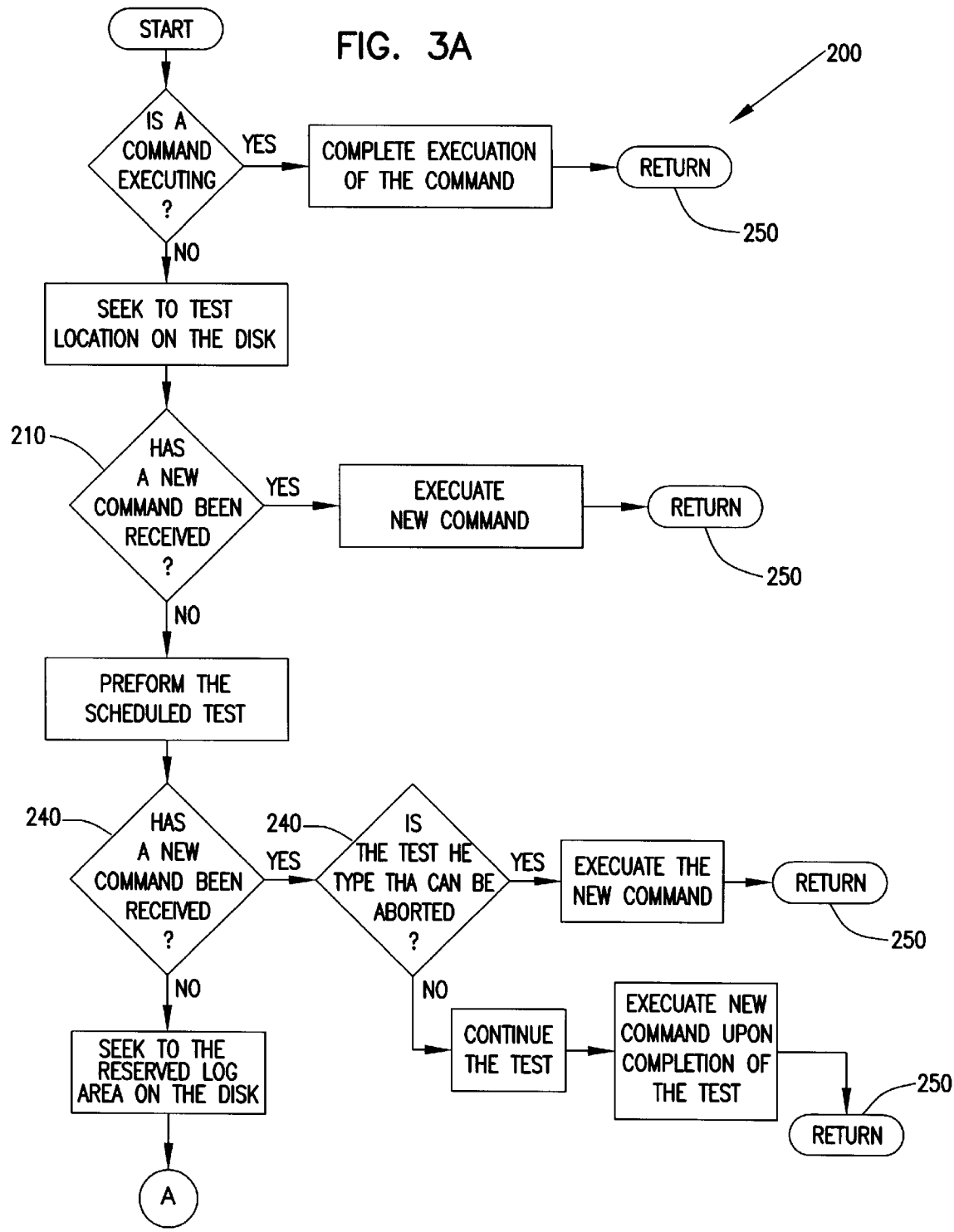

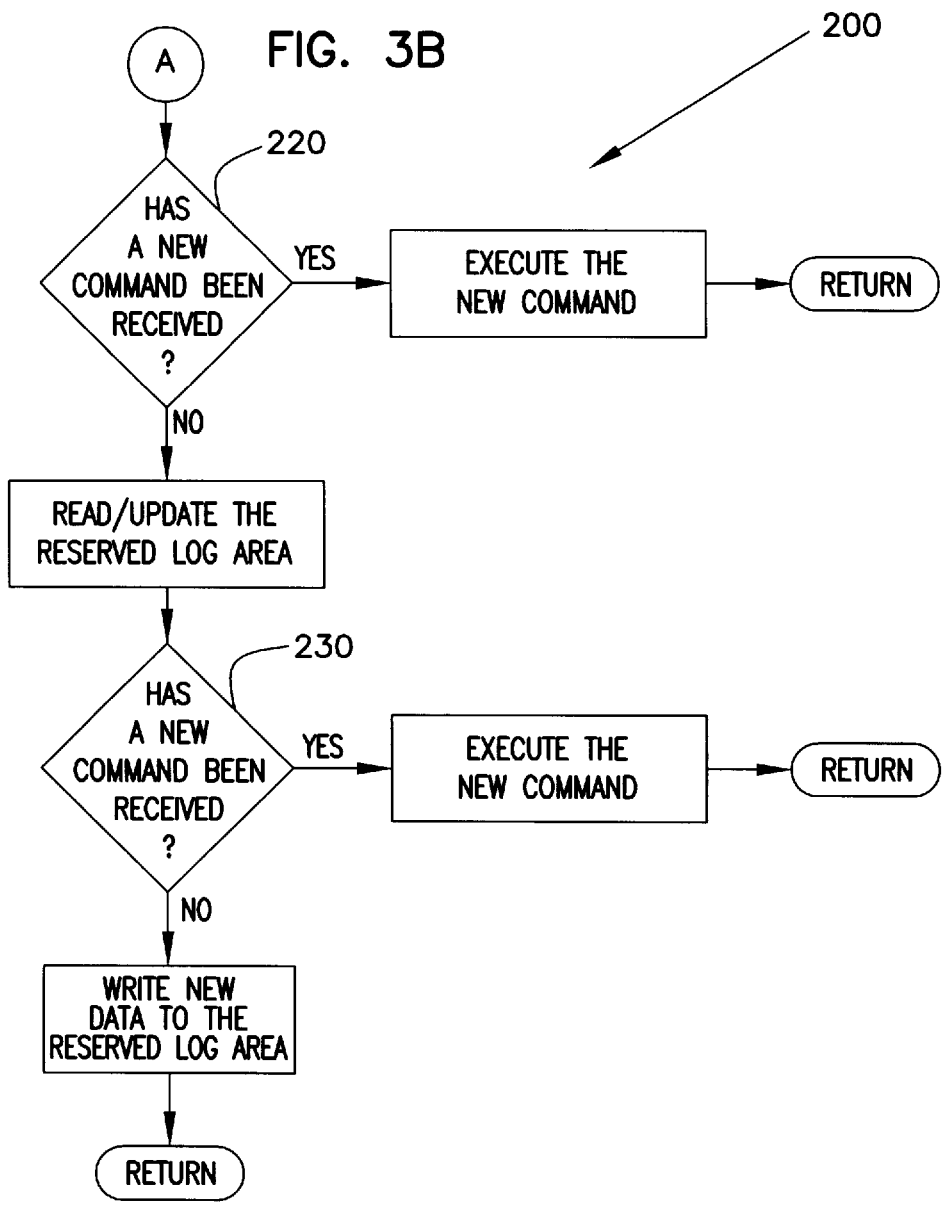

PREEMPTABLE IDLE TIME ACTIVITIES FOR CONSTANT DATA DELIVERY BY DETERMINING WHETHER INITIATING A HOST COMMAND WILL CONFLICT WITH AN IDLE TIME ACTIVITY BEING EXECUTED

BACKGROUND OF THE INVENTION

1. Field of the Invention

This invention relates in general to a method and apparatus for providing constant data delivery, and more particularly, to a method and apparatus for performing preemptable calibration and housekeeping functions during idle time between commands thereby maximizing data throughput.

2. Description of Related Art

Computer systems development is continuing at a rapid pace as market requirements continue to evolve. For example, the integration of text, graphics, digitized video, and sound into one database, commonly referred to as "multimedia", was traditionally a function of mainframe and minicomputers. Even though resource sharing was known to be cost efficient, prior systems and methods were too expensive or too narrow in bandwidth for real-time transfer of the large amounts of information required by multimedia applications. Nevertheless, powerful personal computers have emerged with the resources to create and/or run multimedia software packages.

Market demands are also impacting disk drive designs thereby spurring the development of disk drives with greater data access, high data transfer rates, and increased storage capacity. To meet these exacting standards, Direct Access Storage Devices (DASD's) have been developed. A DASD is a storage system which includes at least one disk having a recording medium applied thereto. In a DASD having more than one disk, the disks are arranged in a stack. Many of the advanced components in a DASD, such as read/write channels and servo systems, require calibration during normal use in order to maintain peak performance under the demands of multimedia applications. In addition, DASD's also perform other functions not directly related to servicing host commands such as monitoring power on hours, gathering performance statistics, monitoring error-rate statistics, etc.

While these housekeeping functions are performed (and the data stored on disk), a DASD may "spontaneously" become busy. Since predicting when the DASD will become busy is impossible, designing a system which can guarantee a predefined minimum bandwidth becomes very difficult. Nevertheless, a guaranteed bandwidth is critical for applications such as multimedia where interruptions in the data stream can result in annoying degradation of video or audio quality.

The time required for performing calibrations to keep a DASD servo system function properly has been decreased considerably in prior systems by implementing an imbedded servo system where servo information is interleaved with customer data on every track of a device. Accordingly, calibration time is no longer a concern for modern DASD's.

In contrast, periodic channel calibrations are needed to maintain good error rates. Further, other periodic measurements are needed to monitor the head disk interface for indications of impending failure. Still, read channel calibrations can generally be deferred by allowing a certain amount of deterioration which will eventually result in a read error. Thus, a portion of the error recovery can be to recalibrate the read channel. Nevertheless, in some multimedia systems, the read recovery is disabled to eliminate overhead. These systems accept the occasional glitch in a single frame of video to prevent a substantial loss of data while a DASD attempts to recover the data. However, this strategy defeats the drives ability to hide channel calibrations in data recovery periods.

A digital channel also has the ability to make measurements directly related to the health of the head/disk interface. These measurements are desirable because they allow a system administrator to move data off of a DASD that is becoming unreliable before a catastrophic failure occurs. However, these measurements also take time and cause interruptions in the steady flow of data from the DASD.

The last class of housekeeping functions are related to collection of information useful to both the DASD and to a system administrator. DASD's collect information over long periods of time which is in turn used for failure analysis by the manufacturer, for decision support in automatically reassigning data to alternate locations due to deterioration in the reliability of a particular location on the device, for gathering performance and operating statistics, and for developing a log of the operating hours of the DASD. The data from these "housekeeping" chores may be stored in a special area called the "reserved" area. This reserved area may be located on the disk or in the random access storage of the microprocessor. Interruptions in the availability of the DASD are caused due to the time required to seek, read or write this data.

In prior systems which did not need to meet the throughput requirements of multimedia applications, housekeeping chores were initiated according to a predetermined schedule and terminated only after completion. Thus, once a housekeeping function began, the system could not entertain commands until the housekeeping chore was completed. Although this could consume one to two seconds, the impact on non-multimedia applications was not a problem. However, glitches of this duration in a video stream or other multimedia application cannot be tolerated. Accordingly, disk drive designers needed to discover techniques of performing housekeeping chores which did not cause glitches to multimedia presentations.

Numerous methods have been devised to handle interrupting the execution of lower priority processes. For example, U.S. Pat. No. 4,930,068, issued May 29, 1990, to Katayose et al., entitled "DATA PROCESSOR HAVING DIFFERENT INTERRUPT PROCESSING MODES", incorporated herein by reference, discloses a data processor capable of effectively processing an interrupt operation at high speeds without saving the content of various registers. Nevertheless, the performance of idle activities, such as the above mentioned housekeeping functions, is not enhanced and the program counter and the program status word at the point of interruption are saved.

To increase speed of interruption, Japanese Patent 58-040670, invented by Keiji Namimoto, entitled "INTERRUPTION CONTROLLER", incorporated herein by reference, discloses jumping a no-return interruption to a new processing program without saving the information from the program executing at the time of the interrupt. While this may be useful in economizing processing and increasing the speed of interruption, the ability to perform idle activities without creating intolerable overhead is not addressed.

One type of design which does address the performance of idle activities to increase throughput is the non-preemptive model. The non-preemption model operates by breaking every test or housekeeping function down into its smallest components, each of which is a complete operation (including the seek). These many small operations are scheduled at a very frequent interval so that they can all be completed within a fixed time. Since there is a fixed overhead at the start and end of each of the housekeeping chores, the strategy of performing them as a set of very small steps actually reduces the total time a DASD can spend performing host commands. The non-preemptive strategy greatly increases the time the DASD spends performing internal functions and thus increases the probability that a host command will clash with an internal function.

There is a need, therefore, for a method and apparatus for performing idle activities in a manner which does not adversely affect the throughput of the system even under the exacting requirements of multimedia applications.

There is also a need, therefore, for a method for performing housekeeping functions on a disk drive without causing glitches in video and audio streams which are being read from the disk drive.

SUMMARY OF THE INVENTION

To overcome the limitations in the prior art described above, and to overcome other limitations that will become apparent upon reading and understanding the present specification, the present invention discloses a method and apparatus for performing preemptable housekeeping functions during idle time between commands thereby maximizing data throughput.

The present invention solves the above-described problems by scheduling fairly complex tests on an infrequent time scale. There is a single seek to get to the measurement location. Once the read/write head is positioned at the measurement location, it stays there for a fairly long time in order to make many measurements. If a host command arrives, the test is aborted and the host command is serviced with a worst case delay of a seek plus log write (approximately 30 to 50 msecs).

A system in accordance with the principles of the present invention comprises a disk drive controller for maximizing data throughput and performing idle time activity while commands are not being processed by the controller, the idle time activity being interrupted upon receipt by the controller of a new command thereby sustaining constant data delivery.

One aspect of the present invention is that idle time activity is abandoned upon receipt of a new command.

Another aspect of the present invention is that the new command is begun without performing any clean-up activity to record the point at which the idle time activity was abandoned.

Yet another aspect of the present invention is that idle time activity is reinitiated after the new command is completed.

Still another aspect of the present invention is that the result from the idle time activity is committed to the disk only after completion of the idle time activity. Thereafter another idle time activity is begun.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout:

FIGS. 3a and 3b illustrate a flow chart diagram of the system for performing preemptable idle time activities for constant data delivery according to the present invention.

DETAILED DESCRIPTION OF THE INVENTION

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

Figure 1:
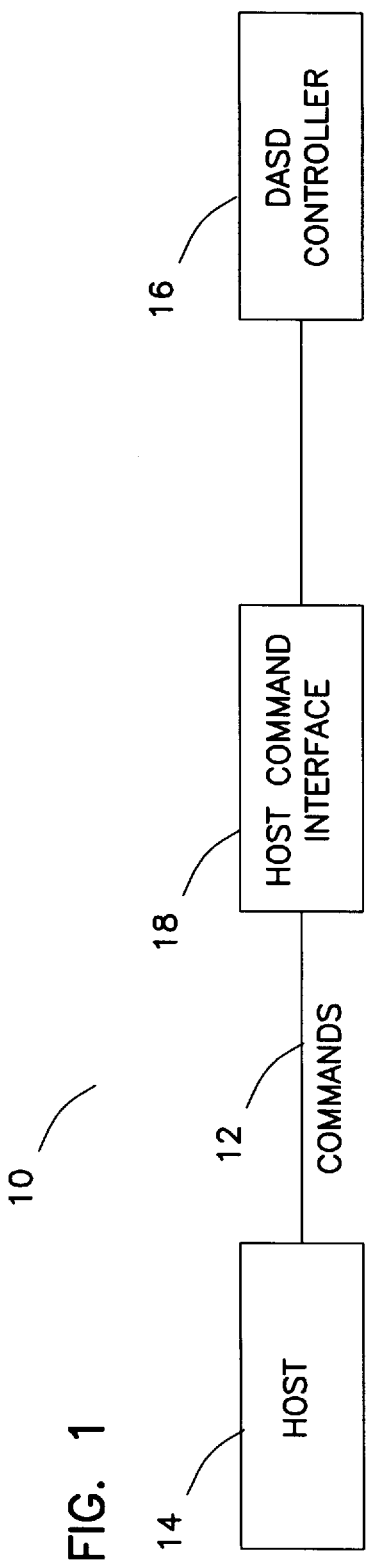
FIG. 1 is a system block diagram of the system for performing preemptable idle time activities for constant data delivery according to the present invention.

The present invention provides a method and apparatus for performing preemptable housekeeping functions during idle time between commands thereby maximizing data throughput. FIG. 1 illustrates an exemplary system 10 according to the present invention. Commands 12 from the host 14 arrive at the DASD 16 via a host interface 18. Host commands 12 which do not conflict with one of the housekeeping functions can execute without interference. Host commands 12 which require the use of the servo or read/write channel will trigger the termination of an active housekeeping function, hereinafter referred to as a test (e.g., log update, channel or servo calibration).

Figure 2:
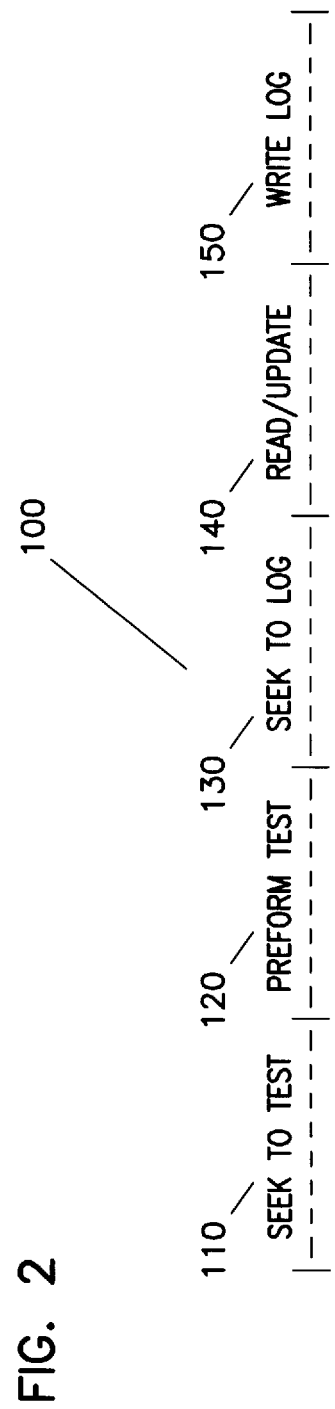
FIG. 2 is an illustration showing the anatomy of a housekeeping function.

FIG. 2 illustrates the anatomy of a housekeeping function or test. FIG. 2 shows a typical timeline 100 for the execution of a test and then writing the results to a log. First the DASD seeks to the area of a disk where the test is to be performed 110. The test is performed while the read/write head is positioned at this point of the disk 120. Once the test is completed, the read/write head is positioned 130 at the reserved area. The log data is read and update 140, and an indication that the test has been completed is made or the data gathered during the test is recorded 150. The above description refers to a generic test or measurement. In practice, specific housekeeping chores may not perform every function listed. For example, a specific test may keep results in the random access storage of the microprocessor instead of writing to a log stored on the actual disk media.

FIGS. 3a and 3b illustrates a flow chart diagram 200 of the system for performing preemptable idle time activities for constant data delivery according to the present invention. The opportunities to interrupt idle activities occur during the initial seek 210, during the seek to the location where the measurement data will be logged 220, and while the log data is being read and updated 230. Some types of measurements and tests can be aborted 240 without impacting the integrity of the system and thus are also a candidate to allow preemption 250.

Depending on the capability of the servo, the housekeeping operation can be aborted either during or at the end of the actual seek operation. The granularity of the "busy" state becomes at worst case the maximum time for a seek, the maximum time of the test or measurement, or the maximum time to write the log data. Some tests can be designed to be partitioned into segments between which an abort can occur giving even more control over the time when a DASD goes spontaneously busy.

Channel calibrations can be designed such that if the calibration does not complete, the state of the channel remains unchanged 250. This allows a channel calibration to be initiated and then simply forgotten. Regardless of whether the calibration completes or not, a new calibration is scheduled at the next periodic interval. Intervals can be scheduled such that even during heavy use enough calibration operations will succeed to maintain the rated error-rate specification for the device.

The write logs phase generally involves writing copies of the data to multiple locations on the device (for data integrity reasons) and should not be interrupted. However, by designing the system such that each of the copies of the log data are offset rotationally and on a different track of the same cylinder, all log data can be written in a single revolution of the disk.

The ability to abort a housekeeping function makes it feasible to schedule many or all of them to occur at the same time. Scheduling them together allows them to share the overhead of the seek to/from the test location. Since this seek generally takes nearly as much time as the measurement there is a great time savings. The host sees a delay related to the amount of time it takes to abort the housekeeping function. Thus, the delay is not related to the duration of any internal functions. This greatly reduces the total time the file spends performing housekeeping functions (and accordingly reduces the probability that a host command will arrive during a housekeeping function).

This method provides advantages over trying to manage the delays caused by internal functions by breaking them down into their smallest components and then scheduling them with equal time intervals. These advantages derive from the fact that the extraneous physical motion associated with moving to/from the test location for each small component is eliminated.

In summary, the present invention schedules fairly complex tests on an infrequent time scale. There is a single seek to get to the measurement location. Once the read/write head is positioned at the measurement location, it stays there for a fairly long time in order to make many measurements. If a host command arrives, the test is aborted and the host command is serviced with a worst case delay of a seek plus log write. If a host command does not arrive, the next measurement need not be executed for a long time. The overhead required by the system in accordance with the invention is very low when the workload is "bursty" or when the file is not saturated. The overhead increases when the file is saturated and there is no idle time available, i.e., when all housekeeping functions keep getting aborted. The worst case behavior of this invention is equivalent to the non-preemptive method while the usual performance is substantially better.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A disk drive controller for maximizing data throughput and performing idle time activity while sustaining high-rate data delivery, the controller determining whether initiating a host command will conflict with an idle time activity being executed and terminating the executing idle time activity in response to determining that the host command will conflict with the idle time activity.

2. The disk drive controller of claim 1 wherein idle time activity is completed in response to determining that the host command will not conflict with the idle time activity.

3. The disk drive controller of claim 1 wherein a host command that requires the use of a data channel will conflict with an idle time activity and dictate termination of the idle time activity.

4. The disk drive controller of claim 1 wherein the data channel comprises a servo channel.

5. The disk drive controller of claim 1 wherein the data channel comprises a read/write channel.

6. The disk drive controller of claim 1, wherein the idle time activity comprises periodic calibrations.

7. The disk drive controller of claim 1, wherein the idle time activity comprises monitoring the head disk interface for indications of impending failure.

8. The disk drive controller of claim 1, wherein the interruption of the idle time activity comprises performing the new command without saving a status of the idle time activity at the point of interruption.

9. The disk drive controller of claim 1, wherein idle time activity is reinitiated after the new command is completed.

10. The disk drive controller of claim 9, wherein the results of the idle time activity are recorded in a log area on the disk after completion of non-interrupted idle time activity.

11. The disk drive controller of claim 1, wherein the interruption of idle time activity provides a guaranteed bandwidth and a rated error-rate specification for the disk drive.

12. The disk drive controller of claim 1, wherein the idle time activity utilizes a single seek operation to perform a group of idle time activities thereby eliminating extraneous seeks and sharing the overhead of the seek to and from the location on the disk for performing the idle time activities.

13. A method of performing preemptable idle time activity to provide constant data delivery, the method comprising the steps of:

determining whether a host command is being processed;

initiating idle time activity in response to no host commands being processed;

receiving a new host command;

determining whether the new host command requires termination of the idle time activity;

interrupting the idle time activity in response to determining that the idle time activity must be terminated; and processing the new command.

14. The method of claim 13, further comprising the step of performing the idle time activity in response to determining that the new host command does not require termination of the idle time activity.

15. The method of claim 13, wherein the step of performing idle time activity further comprises the steps of:

seeking to a test area on a disk;

performing a test;

seeking to a log area on the disk;

reading and updating the log; and writing data obtained from the test to the log.

16. The method of claim 13, wherein the step of initiating idle time activity comprises the step of performing periodic calibrations.

17. The method of claim 13, wherein the step of initiating idle time activity comprises the step of monitoring the head disk interface for indications of impending failure.

18. The method of claim 13, wherein the step of processing the new command is performed without saving a status of the idle time activity at the point of interruption.

19. The method of claim 13 further comprising the step of reinitiating idle time activity after completion of the new command.

20. The method of claim 19, wherein the step of reinitiating the idle time activity further comprises the steps of completing the idle time activity to produce a result and recording the result after completion of the idle time activity.

21. A direct access storage device, comprising:
an interface means for connecting to a computer for receiving and transmitting data;
a plurality of disk storage means, each having a plurality of spindles upon which the disk storage means are mounted; and
a common controller connected to the interface means for controlling each of the disk storage means, the controller further comprising means for performing idle time activity while sustaining high-rate data delivery and determining whether initiating a host command will conflict with an idle time activity, an idle time activity being terminated in response to determining that the host command will conflict with the idle time activity.

22. The direct access storage device of claim 21 wherein a host command that requires the use of a data channel conflicts with an idle time activity and dictates termination of the idle time activity.

23. The direct access storage device of claim 21 wherein the data channel comprises a servo channel.

24. The direct access storage device of claim 21 wherein the data channel comprises a read/write channel.

25. The direct access storage device of claim 21, wherein the idle time activity comprises periodic calibrations.

26. The direct access storage device of claim 21, wherein the idle time activity comprises monitoring the head disk interface for indications of impending failure.

27. The direct access storage device of claim 21, wherein the interruption of the idle time activity comprises performing the new command without saving a status of the idle time activity at the point of interruption.

28. The direct access storage device of claim 21, wherein idle time activity is reinitiated after the new command is completed.

29. The direct access storage device of claim 21, wherein the results of the idle time activity are recorded in a log area after completion of non-interrupted idle time activity.

30. The direct access storage device of claim 21, wherein the interruption of idle time activity provides a guaranteed bandwidth and a rated error-rate specification for the disk drive.

31. The direct access storage device of claim 21, wherein the idle time activity utilizes a single seek operation to perform a group of idle time activities thereby eliminating extraneous seeks and sharing the overhead of the seek to and from the location on the disk for performing the idle time activities.

32. A disk drive system, comprising:
at least one storage disk;
means for rotating the storage disk;
a positional head assembly; and
a disk controller connected to the positional head assembly for maximizing data throughput and performing idle time activity while sustaining high-rate data delivery, the controller determining whether initiating a host command will conflict with an idle time activity and terminating the idle time activity in response to determining that the host command will conflict with the idle time activity.

33. The disk drive system of claim 32 wherein idle time activity is completed in response to determining that the host command does not conflict with the idle time activity.

34. The disk drive system of claim 32 wherein a host command that requires the use of a data channel conflicts with an idle time activity and dictates termination of the idle time activity.

35. The disk drive system of claim 32, wherein the interruption of the idle time activity comprises performing the new command without saving a status of the idle time activity at the point of interruption.

36. The disk drive system of claim 32, wherein idle time activity is reinitiated after the new command is completed.

37. The disk drive system of claim 32, wherein the results of the idle time activity are recorded in a log area after completion of non-interrupted idle time activity.

38. The disk drive system of claim 32, wherein the interruption of idle time activity facilitates the maintenance of a guaranteed bandwidth and a rated error-rate specification for the disk drive.

39. The disk drive system of claim 32, wherein the idle time activity utilizes a single seek operation to perform a group of idle time activities thereby eliminating extraneous seeks and sharing the overhead of the seek to and from the location on the disk for performing the idle time activities.

* * * * *